United States Patent
O'Connor

(12) 
(10) Patent No.: US 6,373,648 B2
(45) Date of Patent: Apr. 16, 2002

(54) DISK HEAD ASSEMBLY WITH MULTIPLE READ AND/OR WRITE TRANSDUCERS FOR IMPROVED PERFORMANCE

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/740,073

(22) Filed: Dec. 18, 2000

Related U.S. Application Data

(62) Division of application No. 09/067,288, filed on Apr. 27, 1998, now Pat. No. 6,195,230.

(51) Int. Cl.$^7$ ............................ G11B 27/36; G11B 5/09; G11B 15/12; G11B 5/596
(52) U.S. Cl. .................. 360/63; 360/78.04; 360/31; 360/53; 360/246.6
(58) Field of Search ................... 360/63, 246.6, 360/61, 78.04, 53, 31

(56) References Cited

U.S. PATENT DOCUMENTS

| | | | | |
|---|---|---|---|---|
| 3,882,473 A | * | 5/1975 | Hoehmann | 360/97.03 |
| 4,007,493 A | * | 2/1977 | Behr et al. | 360/77.07 |
| 4,030,130 A | | 6/1977 | Smith | 360/77 |
| 4,031,443 A | | 6/1977 | Droux et al. | 318/561 |
| 4,152,736 A | * | 5/1979 | Jansen et al. | 360/78.04 |
| 4,622,615 A | * | 11/1986 | Desserre | 360/121 |
| 4,807,074 A | * | 2/1989 | Kamo | 360/316 |
| 4,882,671 A | * | 11/1989 | Graham et al. | 360/77.04 |
| 4,903,151 A | * | 2/1990 | Mizukami et al. | 360/78.01 |
| 4,928,192 A | * | 5/1990 | Bartlett et al. | 360/77.08 |
| 5,010,430 A | * | 4/1991 | Yamada et al. | 360/103 |
| 5,218,497 A | * | 6/1993 | Tanabe et al. | 360/113 |
| 5,257,148 A | * | 10/1993 | Solhjell et al. | 360/77.06 |
| 5,541,792 A | | 7/1996 | Kinoshita et al. | 360/106 |
| 5,568,454 A | * | 10/1996 | Shima et al. | 369/13 |
| 5,682,274 A | | 10/1997 | Brown et al. | 360/77.04 |
| 5,694,270 A | | 12/1997 | Sone et al. | 360/104 |
| 5,995,461 A | * | 11/1999 | Sedlmayr et al. | 369/48 |

FOREIGN PATENT DOCUMENTS

| | | | |
|---|---|---|---|
| EP | 471314 | * | 2/1992 |
| WO | 9630897 | * | 10/1996 |

OTHER PUBLICATIONS

IBM Technical Disclosure Bulletin, Jul. 1984; vol. 27, Issue No. 2, p. No. 946; "Line Signal Quality Detector".*

* cited by examiner

Primary Examiner—Regina Y. Neal
(74) Attorney, Agent, or Firm—Blakely, Sokoloff, Taylor & Zafman LLP

(57) ABSTRACT

A recording disk apparatus is provided. The recording disk apparatus includes a recording disk having at least one recording surface with a plurality of spaced recording tracks. The recording disk also includes a positioning arm with a head assembly. The head assembly has a plurality of read transducers. Each consecutive transducer is positioned relative to one another at a distance substantially smaller than a spacing between two consecutive tracks.

11 Claims, 6 Drawing Sheets

DISK HEAD ASSEMBLY WITH MULTIPLE READ AND/OR WRITE TRANSDUCERS FOR IMPROVED PERFORMANCE

This application is a divisional of application Ser. No. 09/067,288 filed Apr. 27, 1998, now U.S. Pat. No. 6,195,230.

BACKGROUND OF THE INVENTION (1) Field of the Invention

The present invention pertains to the field of disk drives. More particularly, the present invention pertains to apparatus and method that utilize a head assembly to read and/or write information from/to the disk drive.

(2) Background Information

One of the key components for certain electrical devices is a place to store data thereon and read data therefrom. For example, compact disk players read data, such as music, from a plastic disk. Another example is a VCR which reads data (video information) from a tape. Computer systems are endowed with devices that may store thereon and from which it may be read therefrom large amounts of data. Computer systems employ a variety of storage devices to store data. One of these devices is a disk drive, which may also be a direct access storage device. FIG. 1 shows a disk 100 onto which data is stored in concentric circular tracks 102. A first track 116 is the closest to a spindle 106.

A disk drive 100, or direct access storage device, includes several disks 104 which look similar to records used on a record player, or compact disks which are used in a C.D. player. The disks are stacked on spindle 106, much like several records waiting to be played. In a disk drive, however, the disks are mounted into the spindle and spaced apart so that the separate disks do not touch each other.

Information is recorded on a surface 110 of each disk. The surface 110 of each disk 104 is uniform in appearance. However, in actuality, each of the surfaces is divided into portions where data is stored. There are a number of tracks 102 disposed in concentric circles like rings on a tree. Each track in a disk drive is further subdivided into a number of sectors of which sectors 117, 118, 119, and 120 are shown in the Figure. Each sector is essentially just one section of the circumferential track.

The recorded information is divided into sectors. Servo information is recorded in radially continuous narrow wedges (not shown) between sectors. The information in the servo sections includes: track number; sector number; and tracking information.

Storage of data on a magnetic disk entails magnetizing portions of the disk in a pattern which represents the data. To magnetize the disk, a small ceramic block which contains a magnetic transducer known as a "write element" is passed over the surface of the disk. More specifically, the write element is flown at a height of approximately six-microinches of an inch from the surface of the disk over the track. The write element is energized to various states, causing the track below to be magnetized to represent the data to be stored.

To retrieve data stored on a magnetic disk, a read element is flown over the disk. The magnetized portions of the disk provide a signal to the read element. By looking at output from the read element, data can be reconstructed and then be used by the computer system.

Like a record, both sides of a disk are generally used to store data or other information necessary for the operation of the disk drive. Since disks are held in a stack and are spaced apart from one another, for both the top and the bottom surface of each disk in the stack of disks there is a corresponding read element and write element. This would be comparable to a stereo that would play both sides of a record at once. Each side has a stylus which may play the particular side of the record.

There are two types of disk drives: rotary and linear. Rotary disk drives have a tone arm that rotates much like a record player. The tone arm of a rotary disk drive, termed actuator arm, holds all the transducers or read/write elements—one head for each surface of each disk supported in a structure that looks like a comb. Like a tone arm, the actuator arms rotate so that the read element and write element attached to the actuator arm can be moved to locations over various tracks on the disk. In this way, the write element can be used to magnetize the surface of the disk at one of several tracks locations in a pattern representing the data. The read element is used to detect the magnetized pattern on one of the tracks of a disk. For example, the needed data may be stored on two different tracks on one particular disk, so to read the magnetic representations of the data, the actuator arm is rotated from one track to another track.

Before writing or reading, the magnetic head must be positioned in close proximity of or above the correct track. This is accomplished by mounting the head on an arm that moves radially, or in an arc to the section of the disk allocated to the write/read operation. In rigid disk drives, many head assemblies and support arms are mounted on one common carriage that is moved as one unit. This is shown in FIG. 2 where a four-platter disk drive 202 is shown with a head carriage 204 moved back and forth by linear voice-coil motor (VCM) 216 that may be identical to the "motor" in a loudspeaker. In linear disk drives, typically, for each disk (platter) 210 there is a double positioning arm 212 that positions the head onto a specific track by virtue of linear movement of the head carriage 204, to which the positioning arm 212 is mounted. FIG. 3 shows a top view of a disk 302 coupled to a linear VCM 304. A linear actuator is disposed inside carriage 306. The actuator is coupled to the positioning arm 308 that has a head mounted at a free end thereof. The actuator causes the head to shift to new track positions.

Rigid disk drives demand fast and precise positioning of the head. At low track densities, it is relatively easy to position the head; at higher densities, it is necessary to use a track-following technique, by using a closed-loop servo. Overall performance of a disk drive is measured by its seek time, which is the average time it takes for a head to move from one track to another (including time to settle over the track), plus the latency, which is the time for one revolution (some may say that the average latency represents the time for one-half revolution).

The access time (to a track) is in the approximate range of 10–30 milliseconds (ms). To position a head accurately, full-forward power of the actuator is applied for half the time required. Then reverse power is applied until the actuator comes to zero velocity. When the process is done, if the control system functions properly, it may position the head precisely on target. This is what servo engineers call a "bang-bang" control.

The servo system keeps track of where the head is. This is typically done with a difference counter that contains the number of tracks to the target. The difference counter is updated as tracks are crossed. When the head has been positioned over the right track, the next task for the disk controller's servo system is to keep the head on track irrespective of mechanical vibrations, aerodynamic disturbances, or changes due to variations in the temperature.

At high-track densities, a direct position feedback from the head itself is necessary to correct for any mistracking. Track misregistration (TMR) may be caused by several items: spindle run-out; resonances and disk flutter; thermal track shift; head settling; actuator interaction; and improper servo writing. A disk drive's TMR is therefore a summation of all the head position errors summed up over a period of time.

Stringent requirements are posed on the head and the mechanism that controls the head such as track-to-track access time, accurate positioning of the head by the servomechanism, and reading by the head from the storage device when the head has stopped moving completely. It is desirable to provide a disk-head assembly with improved performance, including decreased track-to-track access times, where reading of data may be performed even when the head has not necessarily been stopped from moving completely. It is also desirable to compensate for effects such as spindle run-out, resonance and thermal effects without having to move the heads as much or as rapidly as current systems require.

SUMMARY OF THE INVENTION

The present invention provides a recording disk apparatus. The recording disk apparatus includes a recording disk having at least one recording surface with a plurality of spaced recording tracks. The recording disk also includes a positioning arm with a head assembly. The head assembly has a plurality of transducers. Each two consecutive transducers are positioned relative to one another at a distance substantially smaller than a spacing between two consecutive recording tracks.

DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
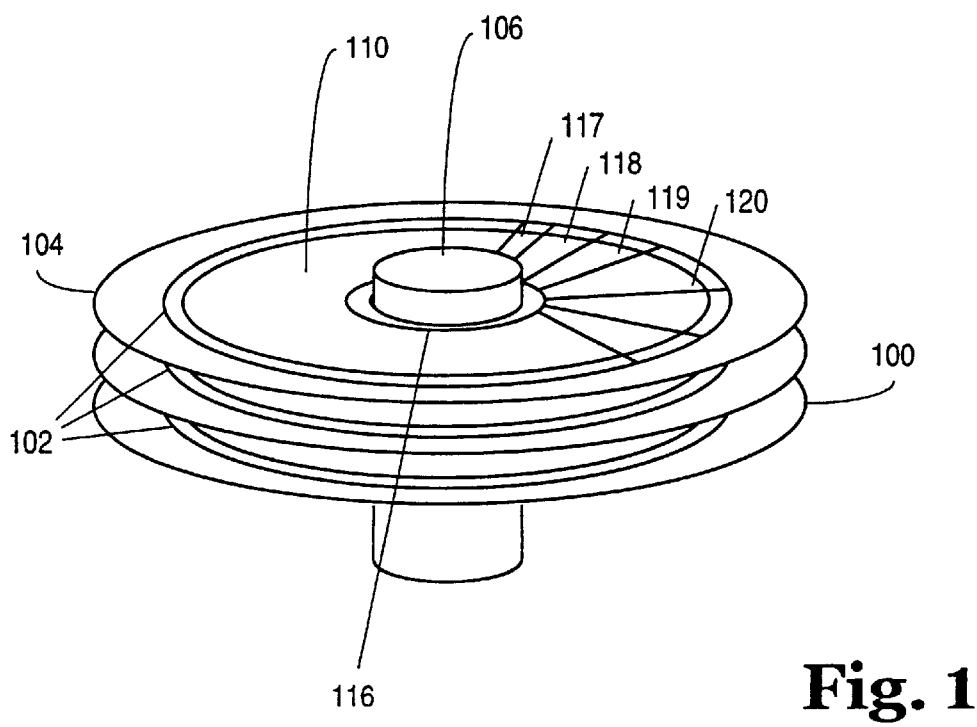
FIG. 1 shows a disk with a number of platters, tracks, and sectors.
Figure 2:
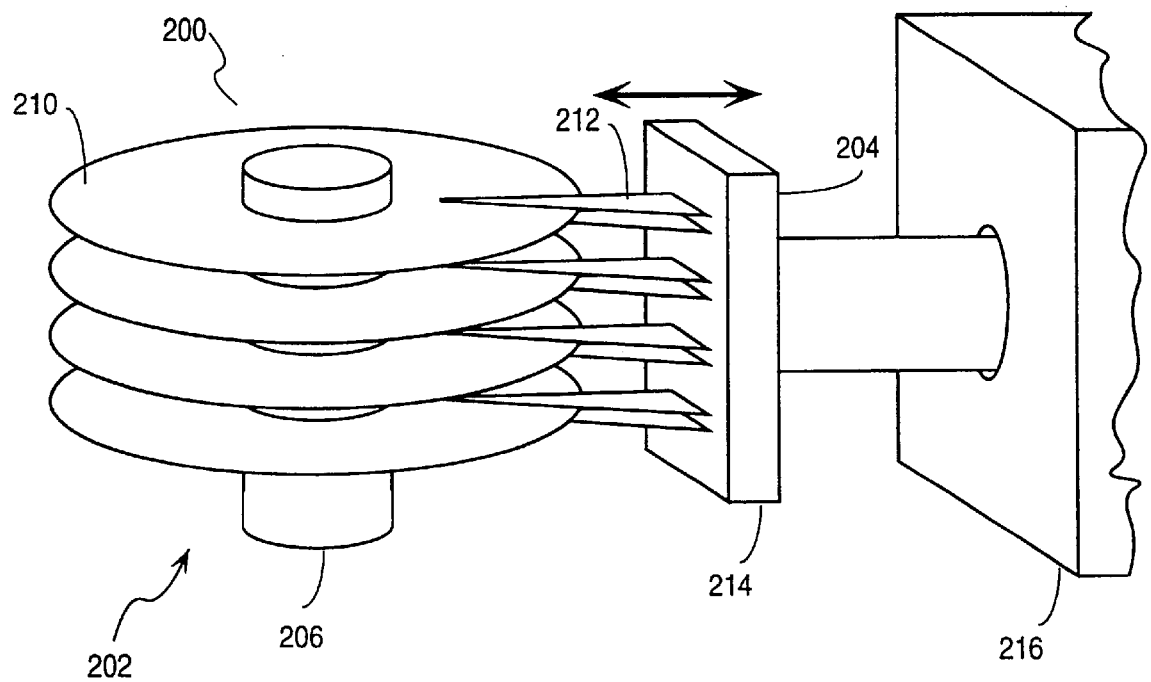
FIG. 2 shows a four-platter disk drive with a head carriage driven by a linear voice-coil motor.
Figure 3:
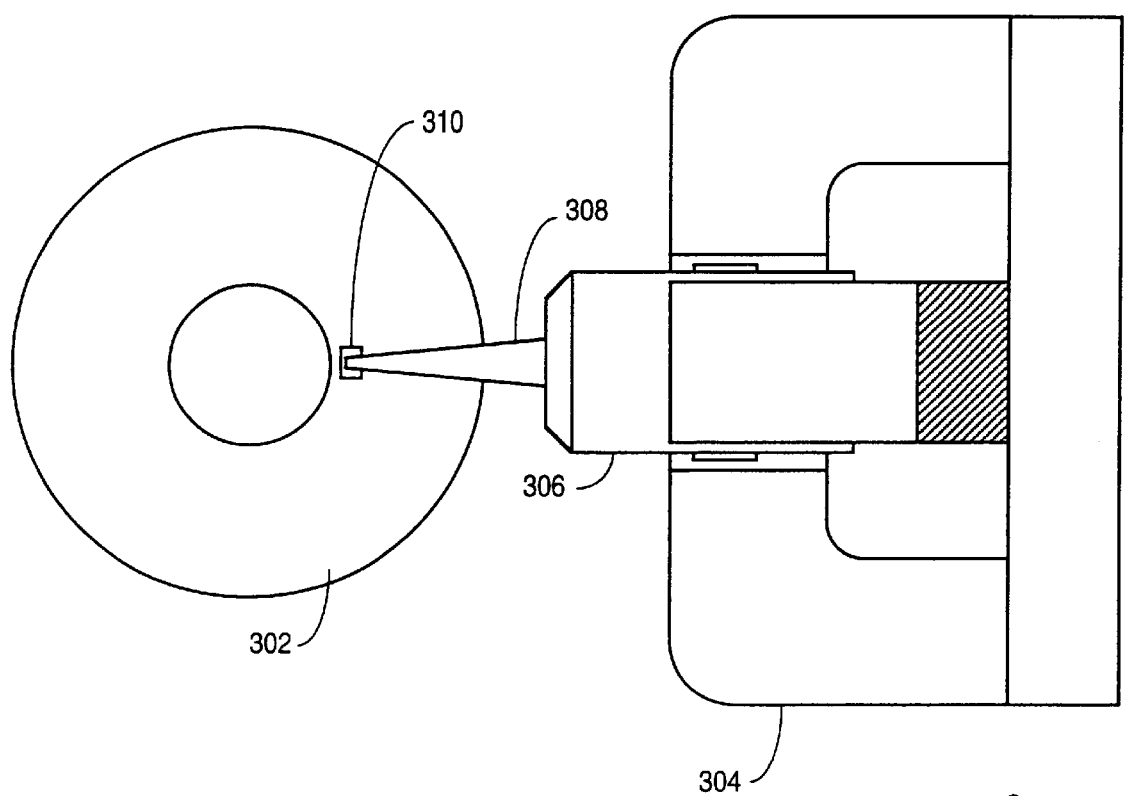
FIG. 3 shows a top view of a disk coupled to a linear voice-coil motor that drives a positioning arm.
Figure 4:
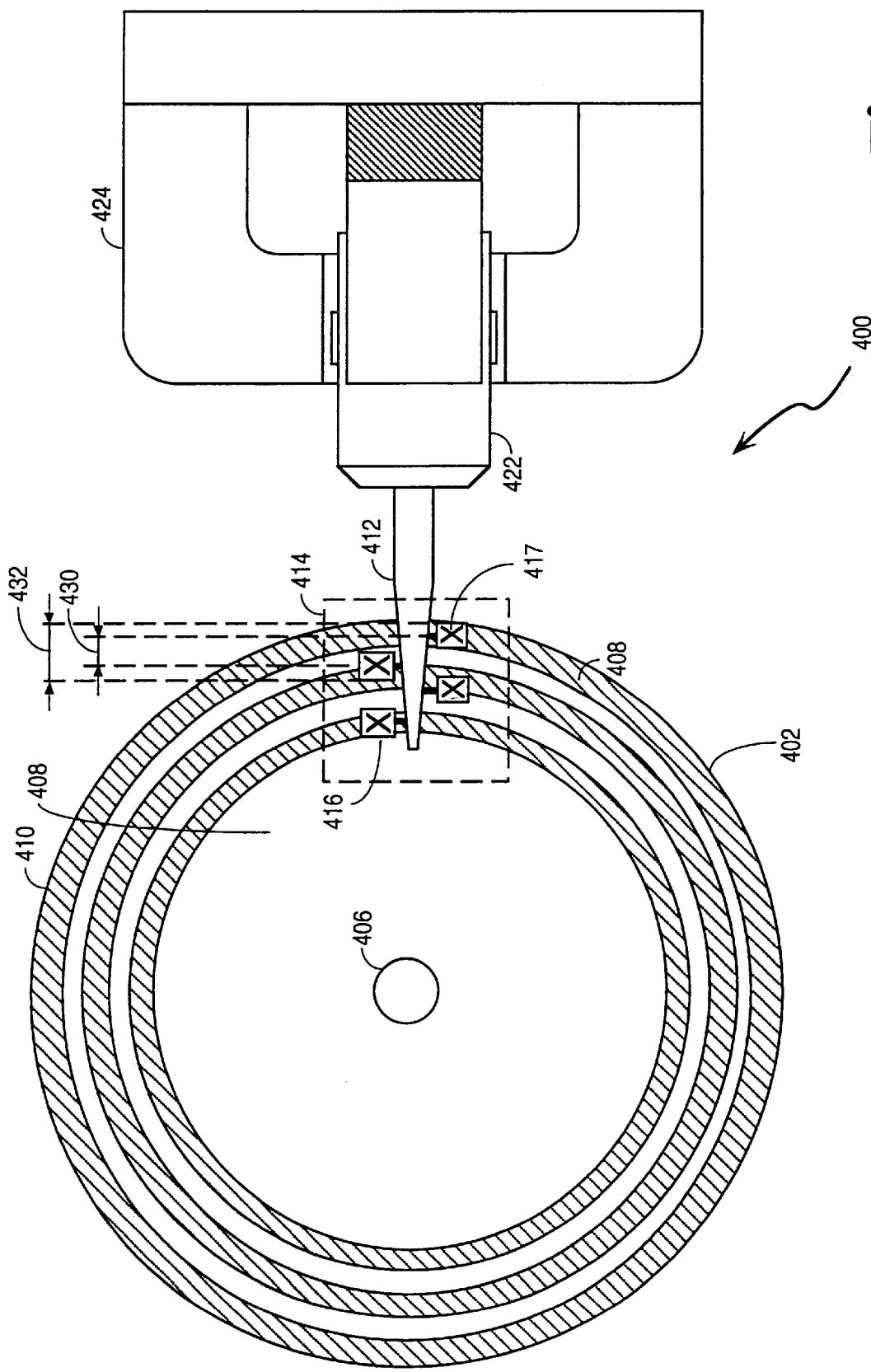
FIG. 4 illustrates in a simplified form a recording disk apparatus with a head assembly with multiple read transducers according to one embodiment of the present invention.

FIG. 4 illustrates a recording disk apparatus with a head assembly with multiple read transducers according to one embodiment of the present invention #. # The recording disk apparatus 400 includes at least one recording disk 402 (hereinafter referred to as "disk 402") which, in one embodiment described herein is a hard disk, but the present invention is not limited to a hard disk. The present invention may apply to other storage devices, magnetic or non-magnetic. The disk 402 is shown from the top, with a top-most platter 408, being understood that the disk drive includes a plurality of disk platters distanced from one another and positioned on spindle 406. Platter 408 includes a plurality of radial tracks 410. The spacing between tracks 410 may be around $\frac{1}{10,000}$ inch.

The recording disk apparatus 400 includes a positioning arm 412 that has at a free end thereof a head assembly 414 (shown in dotted lines). The head assembly 414 includes an array of transducers 416. In one embodiment according to the present invention, transducers 416 are "read" transducers. In other embodiments of the present invention, transducers 416 may be "write" transducers. In one embodiment of the present invention, transducers 416 are fixedly positioned, relative to one another. Two consecutive transducers are positioned at a distance 430 there between substantially smaller than a spacing 432 between two consecutive tracks 410. The distance between the centers of two transducers is defined herein as the horizontal component of a vector that joins the centers 417 of two consecutive transducers.

The recording disk apparatus has a positioning arm 412 for each recording platter 408. For each surface 404 of each platter, there is an array 414 corresponding thereto. The arrays 414 are moved by the corresponding positioning arms 412 at the same time. The positioning arm 412 is mounted on a head carriage 422 which is coupled to a linear voice-coil motor (VCM) 424 that produces the linear motion of the head carriage. The array 414 is designed such that at least one transducer 416 may properly read a certain track at a given point in time. Therefore, there is at least one transducer producing a good signal derived from the target track. While the head assembly 414 (shown in the Figure) includes 4 transducers, the head assembly may be implemented to have more or less than 4 transducers.

As rotation occurs, if the array 414 is wide and dense enough (i.e., many transducers per unit of space), one of the transducers may read one of the tracks that otherwise may not have been read due to the amount of run-out (eccentricity). Accordingly, in this case, there may be no need for a real-time feedback loop to constantly operate to track the eccentricity in the motion.

Typically, the separation between two consecutive transducers depends on how close a transducer needs to be to a track to read it. The separation between tracks is one factor in determining how close a transducer has to be to a particular track that is to be read. Since the strength of the signal that each track generates in the transducer depends on the distance from the track to the transducer, the transducer must be closer to the target track than to any other track. The degree to which transducers have to be closer depends on the signal-to-noise ratio. The "signal" represents the signal from the targeted track that is to be read out. The "noise" is a signal from a track other than the target track that is not desired to be read out at a specific time. The minimum required signal-to-noise ratio for the signal may require that the transducers be as close as possible to the track. In one embodiment according to the present invention, the transducers are separated by a space that represents approximately 70% of the track-to-track distance.

Figure 5:
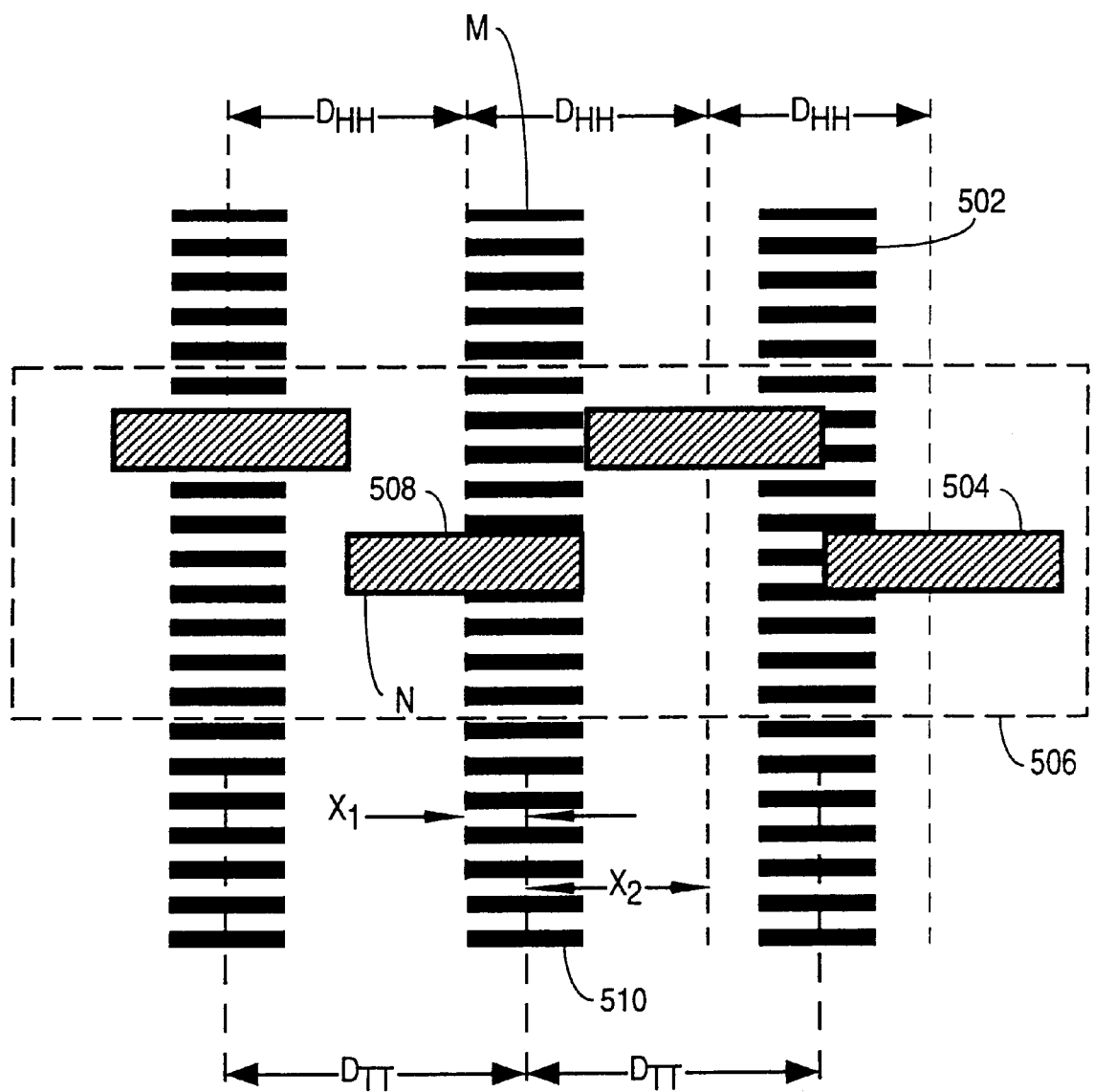
FIG. 5 illustrates in diagramatic form three tracks and four transducers of an array of transducers according to one embodiment of the present invention.

FIG. 5 illustrates in diagramatic form three tracks and four transducers of an array of transducers 506 of a head assembly according to one embodiment of the present invention. In this figure $D_{TT}$ is the track-to-track spacing (i.e., the distance between the centers of two consecutive tracks), while $D_{HH}$ is the transducer-to-transducer distance (i.e., the distance between the centers of two consecutive transducers). Assume that P is the head assembly's position (determined by the positioning arm). The radial position of a transducer "N" is $P+N \times D_{HH}$ where "N" is the number of the transducer (i.e., "N" is the Nth transducer) when transducers are counted from the head assembly's position P towards the periphery of the disk. The radial position of track "M" is $M \times D_{TT}$, where M is the number of the track (i.e., "M" is the Mth track) when tracks are counted from the center of the disk.

Assume that 508 ("N") is positioned to the left of track 510 ("M"), $X_1=(M \times D_{TT}-P+N \times D_{HH}) \mod D_{HH}=(M \times D_{TT}-P) \mod D_{HH}$, where $X_1$ is the distance between the center of the track (510) and the center of the transducer 508. Using the same mathematical formalism, $X_2=(P+(N+1) \times D_{HH}-M \times D_{TT}) \mod D_{HH}=(P-M \times D_{TT}) \mod D_{HH}=D_{HH}-(M \times D_{TT}-P) \mod D_{HH}$. Note that $(M \times D_{TT}-P) \mod D_{HH}$ can assume values from 0 to $D_{HH}$. If $(MXD_{TT}-P) \mod D_{HH}<D_{HH}/2$, X1 is less than X2. If $(M \times D_{TT}-P) \mod D_{HH}>D_{HH}/2$, X2 is less than $X_1$. Therefore, the minimum value between X1 and X2, $\min(X1,X2)<=D_{HH}/2$, which is to say that in the embodiment of the present invention described herein, at least one transducer is less than $D_{HH}/2$ away from the target track if the target track is located within the array of transducers. Even if the position of the positioning arm (not shown) varies, as long as the target track is still under the array of transducers, some transducer of the array is positioned within half the transducer-to-transducer spacing from the target track. This also applies if the position of the tracks varies (due to run-out) as may be found by measuring the run-out relative to the position of the head assembly.

To obtain a usable signal from the target track, transducers are positioned away from the target track at distances equal to or lesser than a track-to-transducer spacing (D) that produces a usable signal. Since $D_{HH}/2 \leq D$ and $D \leq D_{TT}/2$, it follows that $D_{HH} \leq D_{TT}$. This means that the distance $D_{HH}$ between two consecutive transducers must be equal to or smaller than the distance $D_{TT}$ between two consecutive tracks.

If consecutive transducers are spaced relative to each other closer than twice the minimum required track-to-transducer distance (i.e., $D_{HH} \leq 2D$), then as long as a track stays underneath the transducer array, one of the transducers, of the array of the recording apparatus according to the embodiment of the present invention, is closer to a track than the minimum required track-to-transducer distance D, and therefore is able to produce a proper (accurate) signal for this track. This remains true even if the transducer array moves slightly (due to thermal or resonance effects, or because the heads have not come entirely to a stop yet) or the track wobbles as the disk rotates.

When two consecutive transducers are positioned within two consecutive tracks at equal distances from the tracks adjacent to each transducer, both transducers may produce good signals derived from the tracks adjacent thereto. The design ensures that the track-to-transducer distance is lower than the minimum required track-to-transducer distance.

When two consecutive transducers are positioned on each side of a track, one of the transducers will detect a good signal for that respective track as the distance between the two transducers is lower than twice the minimum required track-to-transducer distance—one of the transducers will be closer to a targeted track than the minimum required distance D. The requirement that two transducers be positioned at a distance less than twice the minimum required distance (2D) ensures that at least one of the two transducers, on each side of a track, properly reads that track's signal.

Electronic circuits coupled to the transducers may determine which transducer is closest to the target track in real time using techniques commonly utilized nowadays in hard disk drives. Also, the electronic circuits may switch control from one transducer to another in the middle of the read operation, and join the outputs of the transducers in such a manner as to prevent the switch from one transducer to another from corrupting output data.

A system may be provided where a head with multiple transducers may be utilized for each surface of a platter of a disk drive in the manner described above. The system may utilize a single write head that may be employed in a manner known to people of ordinary skills in the art. The write head may be positioned over the correct track by monitoring one read transducer in the array of transducers that was positioned at the same distance away from the center of the disk's rotation as the write head. It should be appreciated by persons having ordinary skills in the art that a system could possibly use multiple write heads in an arrangement similar to that described in connection with read transducers.

By reading out with a read transducer one may determine when a head (transducer) is on the right track. Therefore, the information about which write head is to be utilized may be based on the information coming from the read array. Thus, one needs to get information out from the read heads to know whether the write head or write heads are positioned correctly. Then one may pick the write head that is most appropriate, i.e. closest to the track desired to be written on that track. While a write operation is performed, the initially selected write head must continue to be the write head used: write heads may not be switched in the middle of a write operation the way read transducers may be switched during a read operation.

Figure 6:
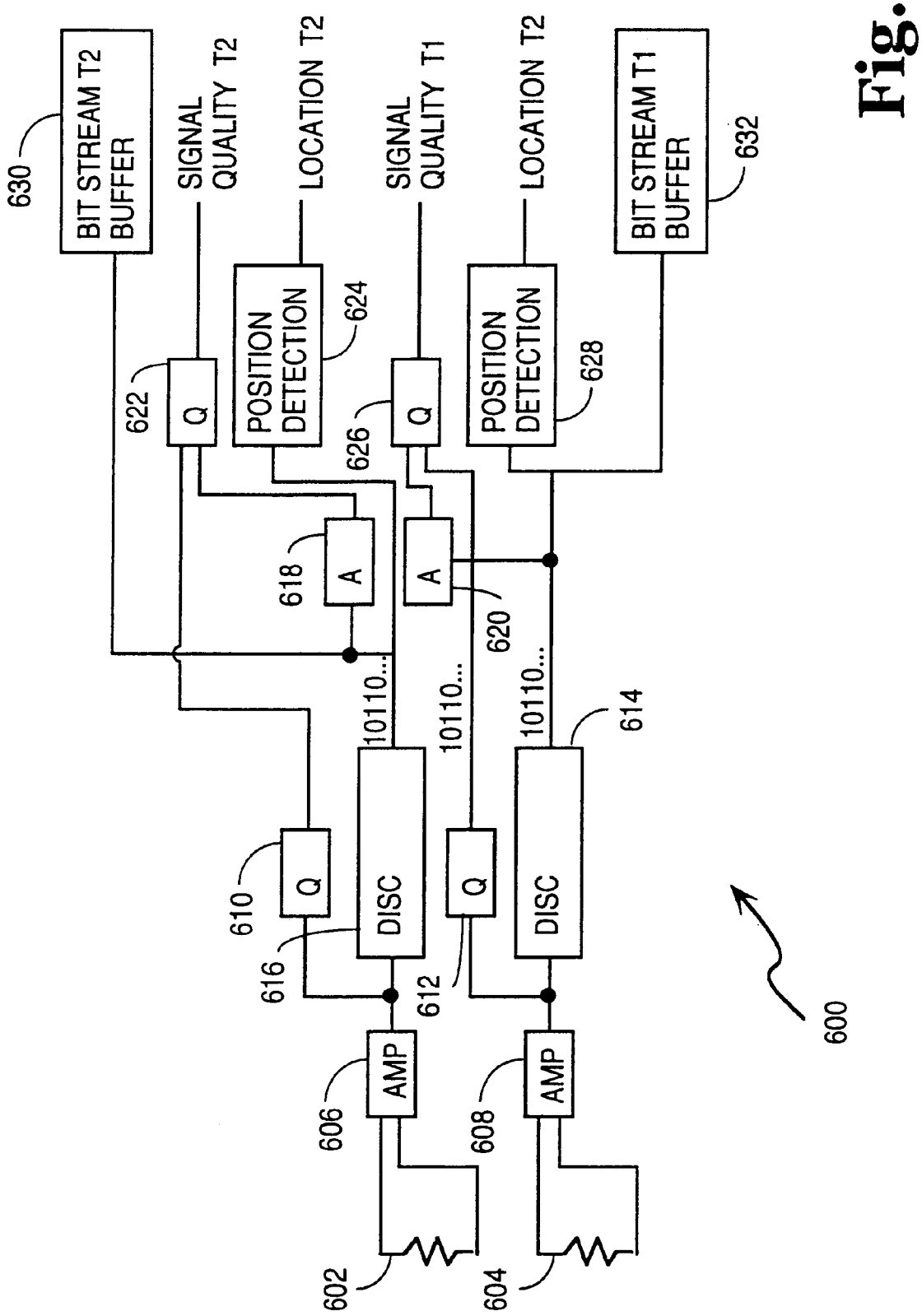
FIG. 6 illustrates a block diagram of an electronic circuit in connection with a disk recording apparatus with a head assembly with multiple read transducers according to one embodiment of the present invention.

Typically, read heads are not spliced—each has its own connection back to the electronics shown in FIG. 6. The same may apply if there are multiple write heads, or they might share a common "ground" wire.

FIG. 6 illustrates a block diagram of an electronic circuit configured to read data from the tracks of a disk by two transducers of an array of transducers. Transducers 602 and 604 are two transducers of a head assembly of an array 414 (as shown in FIG. 4) or 506 (as shown in FIG. 5) that are implemented in one embodiment according to the present invention as two magneto-resistive elements. Due to the certain amount of run-out, one of the transducers of the array, at a certain point in time, may be more likely to read more accurately certain data from the track and mostly to produce a signal that has a strength that more accurately reflects that data. Accordingly, at times, it may be required to switch from one transducer to the other so that one reads from the transducer that is more closely positioned to the desired portion of the track to be read out.

In the circuit 600, the two transducers 604 and 602 read in an analog fashion data from a track and convey it into an analog signal. The analog signal is driven to the amplifiers 606 and 608, corresponding to the transducers 602 and 604 respectively, where the signal is amplified.

From the amplifiers 606 and 608, data is driven to a corresponding discriminator 616 or 614, which converts the analog signal into a digital signal giving rise to bit streams. Measuring circuits 610 and 612 are coupled in parallel with the discriminators to analyze the analog signals coming off the amplifiers and determine whether the analog signals are clean signals coming off of a single track or if the signals are "dirty" because a particular transducer was positioned between two tracks. Implementation of the quality measuring circuit may be performed in different ways. One may look at the absence or lack of a particular frequency spectrum at the output of the amplifier, or one may just look at the signal strength in general and determine whether the signal is a strong enough signal or not. Implementation of the quality measuring circuit is within the ambit of persons skilled in the art. Detection of whether the information collected by a transducer is correct may be also performed by using error-detecting codes built into the data written down onto the disk drive.

Blocks 618 and 620 represent circuits designed to perform quality analysis of the outputs of the discriminator, based on the bit streams, using common techniques known to persons having ordinary skill in the art. Blocks 622 and 626 represent circuits that combine the analog signal derived and digital signal derived quality metrics. Analog signals derived from signals quality-metrics may not be needed if the converted bit streams may supply quality data (for example, by the number of invalid codes in the bitstream). Once a lot of errors are found, one may conclude that the transducer is not aligned correctly.

Circuit 600 may also extract information about what track and sector a transducer is on. That information may be embedded in the magnetic field of the track. For each transducer, one has 3 signals output by circuit 600. First, one has a bitstream coming out of devices 616 and 614, going to buffers 630 and 632 respectively. One may have a signal that denotes quality coming out of circuits 622 and 626, and a signal that represents the location of a transducer. The location is detected by position-detection circuits 624 and 628. Based on the quality and the location detected, one may select which of the transducers had the information one desires.

When switching bitstream buffers in the middle of a read operation, it may occur that the bitstream from one transducer is slightly out of sync with the bitstream from the other transducer. The bitstream buffers can store sufficient data to permit the two streams to be merged together correctly as one switches from one transducer to the other transducer, so that no bits are dropped and no bits are duplicated. This may be accomplished by pattern matching between the two bit streams or by a built-in knowledge of the physical location of each transducer (and therefore the temporal skew in the bit streams from each transducer), or a combination of both. The bitstream buffers 630 and 632 then may be connected to a selecting device such as a multiplexer that may be controlled by the location signals coming out of the position detection circuits 624 and 628.

If two tracks on the same surface are both within the area covered by the array of transducers, both may be readout simultaneously. Also, since fine tracking of a track being read are resolved within each array without moving or in any way affecting all the other head arrays, it is possible to read a track out from every surface of the disk drive simultaneously.

Figure 7:
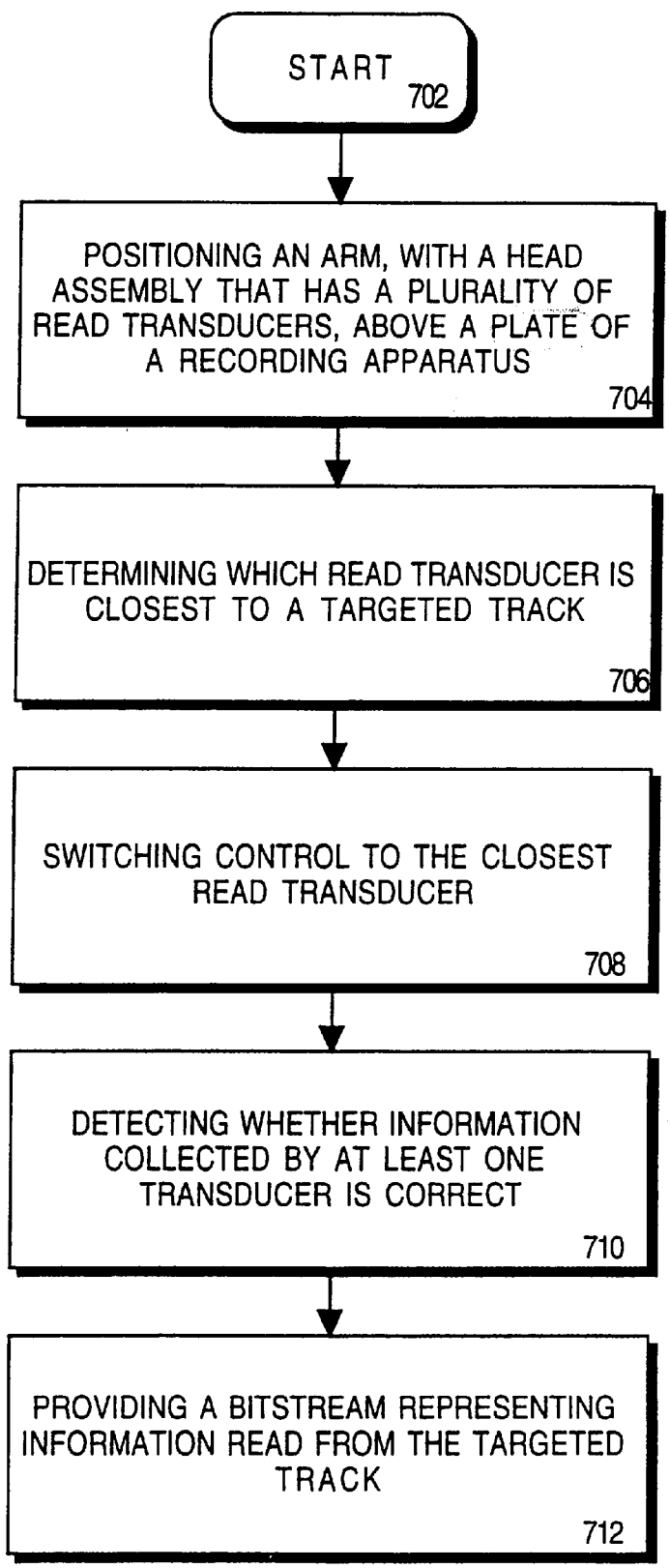
FIG. 7 illustrates a flow chart diagram in connection with a method for reading data from a recording disk according to one embodiment of the present invention.

The present invention also provides, in one embodiment thereof, a method for reading data from a recording disk. FIG. 7 illustrates a flow chart diagram of an embodiment of the method of reading data from a recording disk according to one embodiment of the present invention. The method starts at block 702 from where it passes to block 704. At block 704 an arm, with a head assembly has a plurality of read transducers, is positioned above a plater of a recording apparatus. The method flows to block 706 where it is determined which transducer is closest to a targeted track. At block 708 control is switched to the closest read transducer. At block 710, it is detected whether information collected by at least one transducer is correct. At block 712, a bitstream representing information read from the targeted track is provided.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for reading data from a recording disk, the method comprising:
    a. positioning an arm, with a head assembly that has at least three read transducers, above a platter of the recording disk, said recording disk having at least one recording surface, the at least one recording surface including a plurality of recording tracks;
    b. defining a center line for each recording track wherein the distance between each center line of two consecutive recording tracks defines a track-to-track spacing;
    c. defining a center line for each read transducer, wherein the distance between each center line of two consecutive read transducers defines a transducer-to-transducer spacing, said transducer-to-transducer spacing defining a distance which is substantially smaller than said track-to-track spacing;
    d. determining which transducer is closest to a targeted-track;
    e. switching to the closest transducer;
    f. detecting whether information collected by one transducer is correct; and
    g. providing a bitstream representing information read from said targeted track.

2. The method of claim 1 further comprising spacing two consecutive read transducers closer than twice a minimum required track-to-transducer distance.

3. The method of claim 1 further comprising positioning one of the read transducers away from an adjacent track, at a distance that is equal to or less than half the distance between consecutive read transducers.

4. The method of claim 1 further comprising using each recording track to define two edges, wherein the distance between opposed edges of two alternate recording tracks defines a length between tracks and wherein the track-to-track spacing does not equal the length between tracks.

5. The method of claim 1 wherein the transducer-to-transducer spacing is approximately 70% of the track-to-track spacing, the method further comprising:
    coupling a signal processing device to the plurality of transducers.

6. The method of claim 1 wherein the at least three read transducers are magnetic transducers and the recording disk is a magnetic recording disk.

7. The method of claim 1 further comprising connecting a motor to the head assembly and an coupling an actuator to the positioning arm.

8. The method of claim 1 further comprising mounting the positioning arm on a head carriage coupled to a linear voice-coil motor (VCM).

9. The method of claim 1 further comprising providing for each of the at least three read transducers a bit stream buffer.

10. The method of claim 1 further comprising detecting a position.

11. The method of claim 1 further comprising detecting signal quality.

\* \* \* \* \*